United States Patent [19]

Weppler

[11] Patent Number: 5,155,839
[45] Date of Patent: Oct. 13, 1992

[54] APPARATUS USING IN UNDIFFERENTIATED STROBE OUTPUT TO INTERFACE EITHER OF TWO INCOMPATIBLE MEMORY ACCESS SIGNAL TYPES TO A MEMORY

[75] Inventor: Robert C. Weppler, Mayfield Heights, Ohio

[73] Assignee: Allen-Bradley Company, Inc., Milwaukee, Wis.

[21] Appl. No.: 414,376

[22] Filed: Sep. 29, 1989

[51] Int. Cl.⁵ .............................................. G06F 13/00
[52] U.S. Cl. ........................... 395/500; 364/DIG. 1; 364/239.9; 364/DIG. 2; 364/927.97
[58] Field of Search ........................................ 395/500; 364/200 MS File, 900 MS File

[56] References Cited

U.S. PATENT DOCUMENTS

| | | |
|---|---|---|
| 4.287.562 | 9/1981 | Huston, Jr. .......................... 364/200 |
| 4.641.261 | 2/1987 | Dwyer et al. ......................... 364/900 |
| 4.882.702 | 11/1989 | Struger et al. ....................... 364/900 |
| 4.899.306 | 2/1990 | Greer .................................. 364/900 |
| 4.967.346 | 10/1990 | Freidin ............................... 364/200 |

OTHER PUBLICATIONS

Motorola Product Preview of MC68HC53 Asynchronous Communication Interface Adapter (ACIA) pp. 3.520-3.523, 1983.

*Primary Examiner*—Thomas C. Lee
*Assistant Examiner*—Richard Lee Ellis
*Attorney, Agent, or Firm*—Quarles & Brady

[57] ABSTRACT

A node adapter chip for linking a node microprocessor to a serial data link incorporates a read/write circuit and an interrupt processing means to allow increased flexibility in connecting the adapter to different node microprocessors with different interface protocols. The read/write input circuit accepts dual strobe or single strobe type read/write commands and the interrupt processor accepts either conventional interrupt handling or "polled" operation for use with microprocessors that do not have interrupt capabilities. A flag multiplexer allows the controller in the node adapter to receive status information from a serial interface in the adapter without the need for extra data transfer cycles.

1 Claim, 4 Drawing Sheets

APPARATUS USING IN UNDIFFERENTIATED STROBE OUTPUT TO INTERFACE EITHER OF TWO INCOMPATIBLE MEMORY ACCESS SIGNAL TYPES TO A MEMORY

BACKGROUND OF THE INVENTION

1. Field of the Invention

This invention relates generally to industrial controllers and specifically to circuitry for connecting remote I/O units, by means of a serial communications link, to the industrial controller.

2. Background Art

Industrial controllers such as those described in U.S. Pat. Nos. 3,810,118, 3,942,158, 4,165,534 and 4,442,504 are typically connected to industrial equipment such as assembly lines or machine tools to operate such processes or equipment in accordance with a stored program. In industrial controllers, such as those disclosed in the above cited patents, the stored program includes instructions which, when executed, examine the condition of selected inputs to the controller from sensing devices on the controlled equipment and energize or de-energize selected outputs from the controller to operate devices on the controlled equipment.

Typically, inputs to the controller may be discrete binary signals such as those from switches which may detect limits of process variables such as motion, temperature, time, or other quantities, or the inputs may be analog measures of the process variables themselves, which are generally then converted to digital binary form for processing. Likewise, the outputs of the controller may be either binary outputs as implemented by mechanical or solid-state relays, or analog outputs produced by means of a digital to analog converter.

The inputs and outputs processed by the controller are received by the controller through I/O modules. A number of I/O modules may be placed with the controller in a rack containing a backplane which electrically interconnects the I/O modules with the controller. Alternatively, the I/O modules may be remotely located and connected to the controller by means of a serial communications "link". An I/O scanner incorporated into the controller allows the controller to send and receive data on this link.

Remote I/O modules may be grouped together within a remote rack and connected to the serial link by means of an adapter. The adapter provides an interface between the serial data on the link and the backplane of the rack and thus provides a shared means for each I/O module to receive and transmit data on the link.

Multiple adapters may be connected to the link each with a separate address to distinguish its own messages from those sent to other adapters. A remote rack may hold 16, 12, 8, or 4 I/O modules and therefore the address of an adapter includes a rack address and a starting quarter to permit multiple racks with less than 16 I/O modules to share one rack address.

For physical locations where only one I/O module is required, a "node adapter" may be connected to the serial link in place of a remote rack and adapter. The node adapter operates in a manner analogous to an adapter on a rack, however, rather than communicating with a plurality of I/O modules distributed on a backplane, the node adapter communicates with only a single I/O module or "node circuitry". In lieu of a backplane, data is typically transferred between the serial link and the node circuitry by means of a random access memory ("RAM") associated with the node adapter. The RAM is read from and written to by a microprocessor associated with the node circuitry.

It is important that the interface between the node adapter and the node circuitry be simple because the burden of the complexity and cost of the interface circuitry is not shared among multiple I/O modules. Maintaining the simplicity of the interface between the node adapter and the node circuitry, however, is complicated by the fact that there is a wide variety of microprocessors that may be used in the node circuitry and each microprocessor may vary in its interface conventions.

For example, there are two common random access memory ("RAM") interface conventions used by most microprocessors. The first of these, termed the "dual strobe convention", makes use of a "read strobe" signal and a "write strobe" signal. The presence of the read strobe and not the write strobe indicates that a read cycle is being requested with the timing of the read cycle indicated by the leading edge of the read strobe signal. Conversely, the presence of the write strobe and not read strobe indicates that a write cycle is requested with the timing indicated by the leading edge of the write strobe signal. This dual strobe RAM interface convention is found, for example, in the Z-80 series of microprocessors manufactured by Zilog of Cupertino, Calif.

The second RAM interface convention is termed the "single strobe protocol". The single strobe protocol makes use of a single undifferentiated "strobe" line and a separate "read/write" line. At the leading edge of the strobe signal a read or write cycle will be started depending on the state of the read/write line. This protocol is found in the 68000 series of microprocessors manufactured by Motorola.

Microprocessors may also differ as to their ability to handle interrupts. Hardware interrupts are a useful interface technique that may increase processing efficiencies in situations when it is necessary that certain conditions be continuously monitored. For example, the serial communications link must be continuously monitored by the node adapter for messages addressed to that node. Those messages must then be passed along to the node microprocessor.

Without the ability to handle interrupts, the microprocessor must continuously poll the node adapter to see if a message has been received. With the ability to handle interrupts, the microprocessor may attend to other tasks and when a message is received by the node adapter, the node adapter interrupts the microprocessor. On receipt of the interrupt, the microprocessor will suspend its current program and start a new program to accept the received message. There may be several different types of interrupts, each associated with a different condition. In order to determine which program to execute on receipt of an interrupt, the node microprocessor typically will receive an interrupt vector from the node adapter which indicates the correct interrupt program to be executed.

The node adapter must be able to rapidly process serial data received from the link. In order to improve the speed with which data may be processed, it is generally known to divide the various communications functions among different processing units. For example, a serial I/O unit may handle the basic serial communications protocols, passing the received data to a more sophisticated controller which handles the higher level communications protocols. Often, processing of the higher level protocols by the controller requires information extracted from the data during the processing of the lower level protocols by the serial I/O unit, for example, indications of certain control characters normally stripped away by the serial I/O unit. Nevertheless, communication of this occasional status information between the serial I/O unit and the controller uses valuable data cycle transfers and hence may reduce the overall operating speed of the node adapter.

SUMMARY OF THE INVENTION

The present invention is a node adapter circuit providing a flexible interface between a remote I/O link and a variety of node microprocessors.

The read/write interface circuit for the node adapter has three logic level inputs: a read line, a write line, and a chip select line. A logic decoding network produces a read output to the node adapter if the read line is active, the write line is inactive and the chip select line is active; and produces a write output to the node adapter if the write line is active and the chip select line is active.

It is one object of the invention to produce an interface circuit to allow a node microprocessor to read and write data to the node adapter regardless of whether the node microprocessor uses a dual strobe or single strobe RAM interface convention. In the dual strobe system, the chip select line is grounded and the read strobe and write strobe signals of the microprocessor are connected to the read and write lines respectively. With the single strobe system, the read line is grounded and the strobe and read/write lines are connected to the chip select and write lines respectively.

The node adapter interrupt handling circuitry is comprised of a vector passing system having an interrupt acknowledge input, a read input, and a read address input. When an interrupt is to be generated, an interrupt pending flag is set indicating that an interrupt is pending. A trigger address read input is active if the node microprocessor is reading a predetermined trigger address. A logic decoder circuit resets the interrupt pending flag in response to either the interrupt acknowledge input or the trigger address read input.

Accordingly, it is another object of the invention to produce an interrupt circuit that may be used with microprocessors which do not have interrupt capability. In such systems the interrupt line is periodically checked. If an interrupt is noted, the microprocessor reads the predetermined trigger address, resetting the interrupt pending flag. On the other hand, if the microprocessor has interrupt capabilities, the interrupt pending flag is reset directly by the interrupt acknowledge signal.

The node adapter includes a controller and a serial I/O unit. The serial I/O unit may communicate status information to the controller by means of the controller's instruction flags. An instruction flag is set by data from the output of a multiplexer. A first input to the multiplexer indicates the result of an arithmetic or logical operation performed by the controller that would conventionally be used to set the flag. A second input to the multiplexer indicates status information from the serial interface. This second input sets the flag when an instruction decoder indicates that the controller is processing a "get received data" command, as is used to transfer data from the serial I/O to the controller.

It is thus another object of the invention to provide a simple means for the controller to have access to the serial I/O status bits without the need for a separate data transfer cycle over the internal data bus. The get received data instruction would not normally affect the status of the flags and hence the flags may be used to communicate state data. The controller may "read" the flags by performing a test instruction.

Other objects and advantages besides those discussed above shall be apparent to those experienced in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the scope of the invention.

DETAILED DESCRIPTION OF THE PREFERRED EMBODIMENT

A. Industrial Controller Architecture

Figure 1:
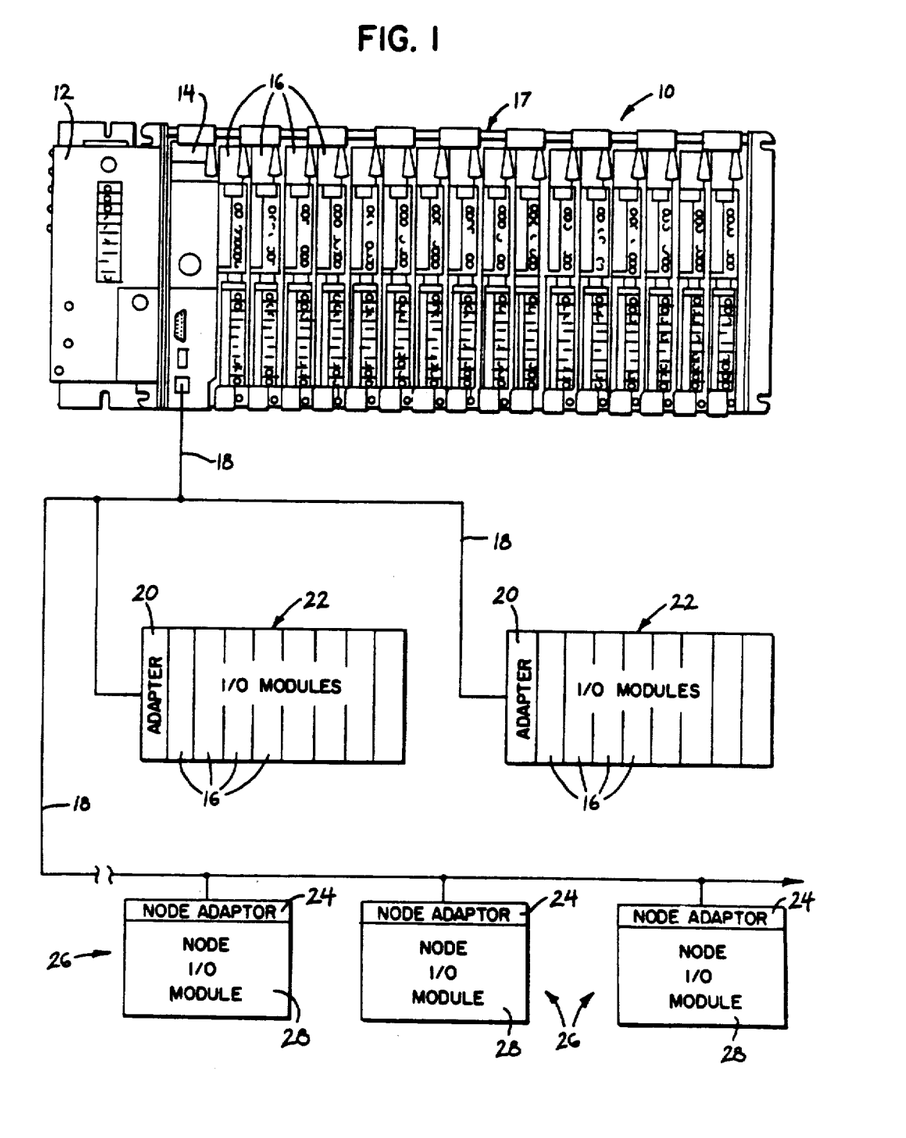
FIG. 1 is a front elevation view of an industrial controller showing the serial communications link and the node adapter of the present invention.

Referring to FIG. 1, an industrial controller which may incorporate the present invention consists of a main controller rack 10. A power supply 12 is attached to the leftmost wall of the rack 10 and provides power for the units contained in the rack and now to be described. The first unit is the controller processor 14 which executes a control program and supervises the input and output states of its various I/O modules 16. The controller processor 14 is inserted in the leftmost slot of the rack 10 and connects to a backplane 17 to communicate with the I/O modules 16 also connected to the backplane 17. The power supply 12 distributes power to the controller processor 14 and the I/O modules 16 along the backplane 17.

Up to 16 I/O modules 16 may be placed in rack 10. Additional I/O modules may be connected to the controller processor via a remote serial I/O link 18 which allows the controller processor 14 to communicate with one or more remote I/O racks 22 or nodes 26.

A remote I/O rack 22 is comprised of an adapter 20 and a number of I/O modules 16 contained in the rack 22. The adapter 20 provides an interface between the link 18 and the I/O modules 16 in its rack 22 by monitoring the link 18 and looking for data "frames" containing its address. For a description of the circuitry and operation of the adapter modules reference is made to Schultz et al. U.S. Pat. No. 4,413,319, entitled: "Programmable Controller for Executing Block Transfer with Remote I/O Interface Racks" and issued Nov. 1, 1983.

As mentioned, the remote serial link 18 may also connect to one or more nodes 26 via node adapters 24. The node adapter 24 functions analogously to the adapter 20 for the remote I/O racks 22, that is, the node adapter 24 provides an interface between the remote I/O serial link 18 and its node circuitry 28 by monitoring the remote I/O serial link 18 and looking for data "frames" containing its address. The primary functional difference between the remote I/O racks 22 and the I/O nodes 26 is that the nodes 26 perform only a single I/O function.

The protocol for the transmission of serial data on the remote serial link 18 is modelled after the IBM synchronous data link control ("SDLC") protocol familiar to those skilled in the art. The data is transmitted in frames comprised of several serial bytes; each frame being distinguished by the presence of leading and trailing flags.

Industrial controllers of the type shown in FIG. 1 are described in more detail in U.S. Pat. No. 4,250,563, entitled: "Expandable Programmable Controller", and issued Feb. 10, 1981, and U.S. Pat. No. 4,293,924, entitled: "Programmable Controller with High Density Intelligent I/O Interface" and issued Oct. 6, 1981.

B. Node Adapter

Figure 2:
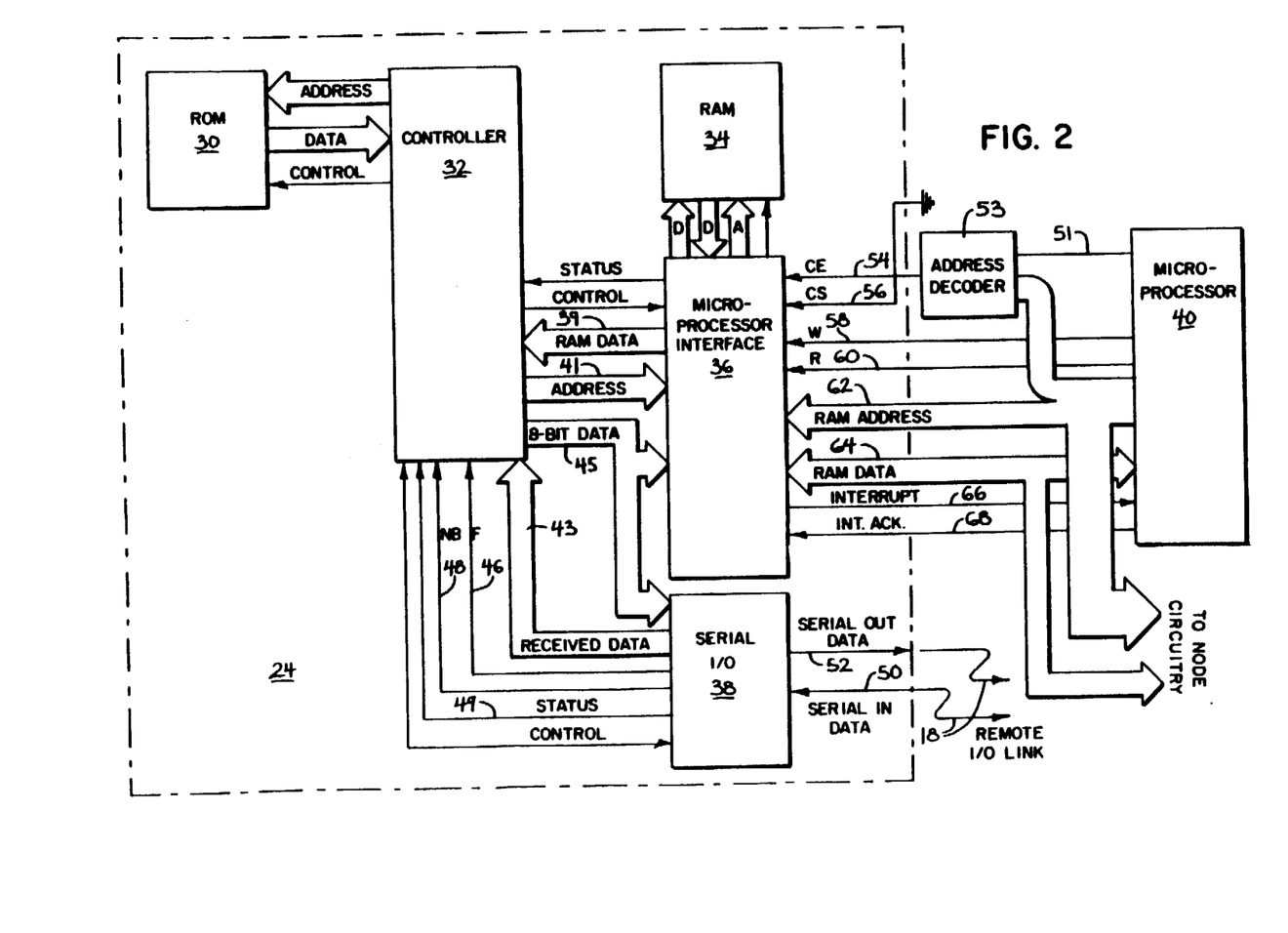
FIG. 2 is a block diagram of node adaptor of the present invention showing its connection to a dual strobe node microprocessor with interrupt capabilities.

Referring to FIG. 2, a node 26 is comprised of a node adapter chip 24, communicating with a separate node microprocessor 40 which handles the actual node I/O functions. The node adapter chip 24 is, in turn, comprised of a controller 32, a microprocessor interface 36, a serial I/O unit 38, a 480 byte RAM 34, and a 2 kilobyte read only memory ("ROM") 30.

The controller 32 performs the arithmetic and logical operations necessary to handle the higher level protocols for interfacing the node with the link 18 such as checking the frame addresses of received data and verifying, but not calculating, the error detection code on the received frame data. The controller 32 executes instructions read from ROM 30 and controls the microprocessor interface 36 and serial I/O unit 38.

The serial I/O unit 38 handles lower level link protocols such as decoding the serial frame data from the link 18 into parallel words and detecting certain control characters such as flags, as described above, which indicate the start and end of a data frame and the abort character which indicates that the current frame is faulty and should be disregarded. The controller 32 communicates with the serial I/O unit 38 by means of an internal 8-bit data bus 45 and the received data bus 43. In addition, the serial I/O unit 38 provides the controller 32 with a flag signal 46 indicating that a flag was received and a normal byte signal 48 indicating that a normal byte has been received. The receipt of an abort signal may be deduced from the absence of a normal byte signal 48 and flag signal 46. The controller reads the normal byte signal 48 and the flag signal 46 by means of its instruction flags as will be described below. The serial I/O unit 38 also provides other status information to the controller 32, such as an indication that the link is available for transmission of data. These status lines 49 differ from the flag and normal byte status lines 46 and 48 in that they need not be examined by the controller 32 after the receipt of every byte of data by the serial I/O unit 38.

The microprocessor interface 36 performs two functions. It mediates between the controller 32 and the node microprocessor 40 in requests for access to the RAM 34, and it provides an interface between the node microprocessor 40 and the controller 32. Specifically, the microprocessor interface 36 provides an interface to the node adapter 24 for RAM read/write control signals 54-60 from the node microprocessor 40 and interrupt control lines 66 and 68 to and from the node microprocessor interface 40 via the 8-bit data bus 45 and the internal address bus 41. A separate RAM data bus 39 provides a path from the microprocessor interface 36 to the controller 32 for RAM 34 data. The RAM 34 may be read and written to by both the controller 32 and the node microprocessor 40 and hence provides a channel of communication between the controller 32 and the node microprocessor 40.

C. RAM control signals

As mentioned, the microprocessor interface 36 receives two sets of control signals from the node microprocessor 40: the RAM control signals 54-60 and the interrupt control signals 66 and 68.

The RAM control signals are received via four lines: a chip enable line 54, a chip select line 56, a write line 58, and a read line 60. The first of these lines, the chip enable 54 is produced by an external address decoder 53 connected to the high order bits of the RAM address 62, and the address strobe 51, from the node microprocessor 40. The chip enable signal 54 allows the microprocessor 40 to access RAM at addresses outside those of the node adapter 24 as is understood in the art.

The purpose of the remaining RAM control signals 56-60 is to allow the node microprocessor 40 to specify whether a RAM read or write cycle is to be executed and to provide a timing signal for the transfer of data. The exact function of these lines will depend on the whether the microprocessor being used follows the single strobe or dual strobe convention as has been previously discussed. The microprocessor 40 shown in FIG. 7 is of the dual strobe convention.

The RAM control signals 56-60 are connected to the outputs of different classes of microprocessors according to their read/write convention as follows:

| Node Adapter Input | Dual Strobe Output | Single Strobe Output |
|---|---|---|
| Chip Select Line 56 | Ground | Strobe |
| Read Line 60 | Read Strobe | Ground |
| Write Line 58 | Write Strobe | Read/Write |

Figure 3:
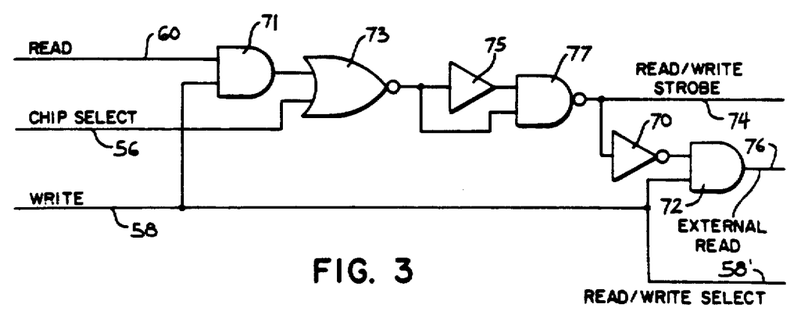
FIG. 3 is a schematic diagram of the read/write interface circuitry of the node adapter circuit of FIG. 2.

Referring to FIG. 3, the inputs to the read and write lines 60 and 58 of the node adapter 24 are combined by AND gate 71 and the resulting signal is combined with the input to the chip select line 56 by NOR gate 73. A "delay" circuit formed of buffer 75 and NAND gate 77 is triggered by the rising edge of the input of NOR gate 73 to produce an inverted read/write strobe signal 74, with approximately a 3 ns. delay, at the output of NAND gate 77. This read/write strobe signal 74 controls the timing of the read or write cycle within the node adapter 24.

The read/write strobe signal 74 is inverted by inverter 70 and combined with the input to the write line 58 by AND gate 72 to form an external read signal 76 whose use will be described below. The unmodified signal on the write line 58 becomes a read/write select signal 58' that indicates to the node adapter 24 whether a read or a write is to be performed. The delay circuit formed by gate 75 and 77 ensures that the read/write select signal 58' has reached its final value prior to the occurrence of the read/write strobe signal 74.

It is assumed that the RAM control signals are inverted, that is, a logical low (zero volts) indicates the "true" state and the logical high (+5 volts) indicates a "false" state. Read and write strobes are therefore negative going pulses. Hereinafter, the term "active" will be used to refer to a signal in the true state and inactive will be used to refer to a signal in the false state regardless of its logical state or voltage.

Referring still to FIG. 3, for connection to a single strobe system, the read line 60 is grounded or set to logical low. Hence a negative going pulse on the chip select line 56 will cause a rising edge on the output of NOR gate 73 because the grounded read line 60 ensures that the output of AND gate 71 is always low. The positive going pulse from the output of NOR gate 73 is delayed by gates 75 and 77 and becomes the negative going read/write strobe signal 74. The read/write select signal 58' simply mirrors the state of the read/write input to the write line 58. The negative going read/-write strobe signal 74 is inverted and when combined with the input to the write line 58 creates the external read signal 76 which is low if the request is a write and high if the request is a read.

The connection of a dual strobe system to the RAM control signals requires that the chip select line 56 be grounded. Now a negative going pulse on the read line 60 or the write line 58 will cause a rising edge on the output of NOR gate 73 because the grounded chip select line ensures that the second input of the NOR gate 73 is always low. Again, the positive going pulse from the output of NOR gate 73 is delayed by gates 75 and 77 and becomes the negative going read/write strobe signal 74. The read/write select signal 58' takes the state of the write strobe input on the write line 58. The delay formed by gates 75 and 77 ensures that the read/write strobe 74 has had sufficient time to reach its final state prior to being interpreted by the node circuitry. As before, the negative going read/write strobe signal 74 is inverted and when combined with the input to the write line 58 creates the external read signal 76, to be described below in connection with the interrupt handling circuitry.

Accordingly, this circuit allows the connection of either a single or dual strobe system to the node adapter 24.

D. Interrupt control circuit

Referring generally to FIGS. 1 and 2, the processing efficiency of the node 26 is increased by delegating the task of monitoring the remote I/O link 18 to the node adapter 24 thus freeing the external microprocessor 40 to attend to other node associated tasks. The ability to delegate the monitoring of the remote I/O link 18 to the node adapter 24 requires that the node adapter 24 be able to advise the microprocessor 40 when link 18 activity requires the attention of the microprocessor 40. Upon an interrupt, the microprocessor 40 will respond by suspending its current program and starting a new program to respond to the link activity indicated by the interrupt. This new program is chosen from several possible interrupt activated programs by means of an interrupt vector or address passed to the microprocessor 40 by the node adapter 24. The interrupt procedure makes use of the interrupt control lines: interrupt line 66 and interrupt acknowledge line 68 as shown in FIG. 2 and to be described below.

The node adapter 24 may interrupt the microprocessor 40 under several circumstances including: the receipt of a valid frame of data addressed to the node 26, a remote I/O link failure indicated by no activity on the link 18 for a predetermined length of time, or the beginning of the transfer of a sequence of data that may require additional preparation time by the microprocessor 40.

As mentioned, however, not all microprocessors are capable of handling an interrupt. Therefore, the node adapter 24 allows for two methods of responding to interrupts: conventional interrupt handling and a special "polling" method of responding to interrupts. Referring to FIG. 2, in conventional interrupt handling, the node adapter 24 generates an interrupt signal which is communicated to the microprocessor 40 by means of interrupt line 66. The microprocessor 40 responds to the interrupt by returning an acknowledgment signal on the interrupt acknowledgement line 68 and reading an interrupt vector from the data lines 64 of the node adapter 24. This action resets the interrupt line 66.

If the external microprocessor 40 cannot handle interrupts, it may use the "polling" procedure by periodically polling or reading the interrupt line 66 as part of the program it is executing. When an interrupt is detected, the microprocessor 40 reads the interrupt vector out of a "trigger" address in the node adapter 42. This action of reading the trigger address causes the signal on line 66 to be reset as in a normal interrupt procedure and presents the interrupt vector on the data lines as in a conventional RAM 34 read cycle.

Figure 4:
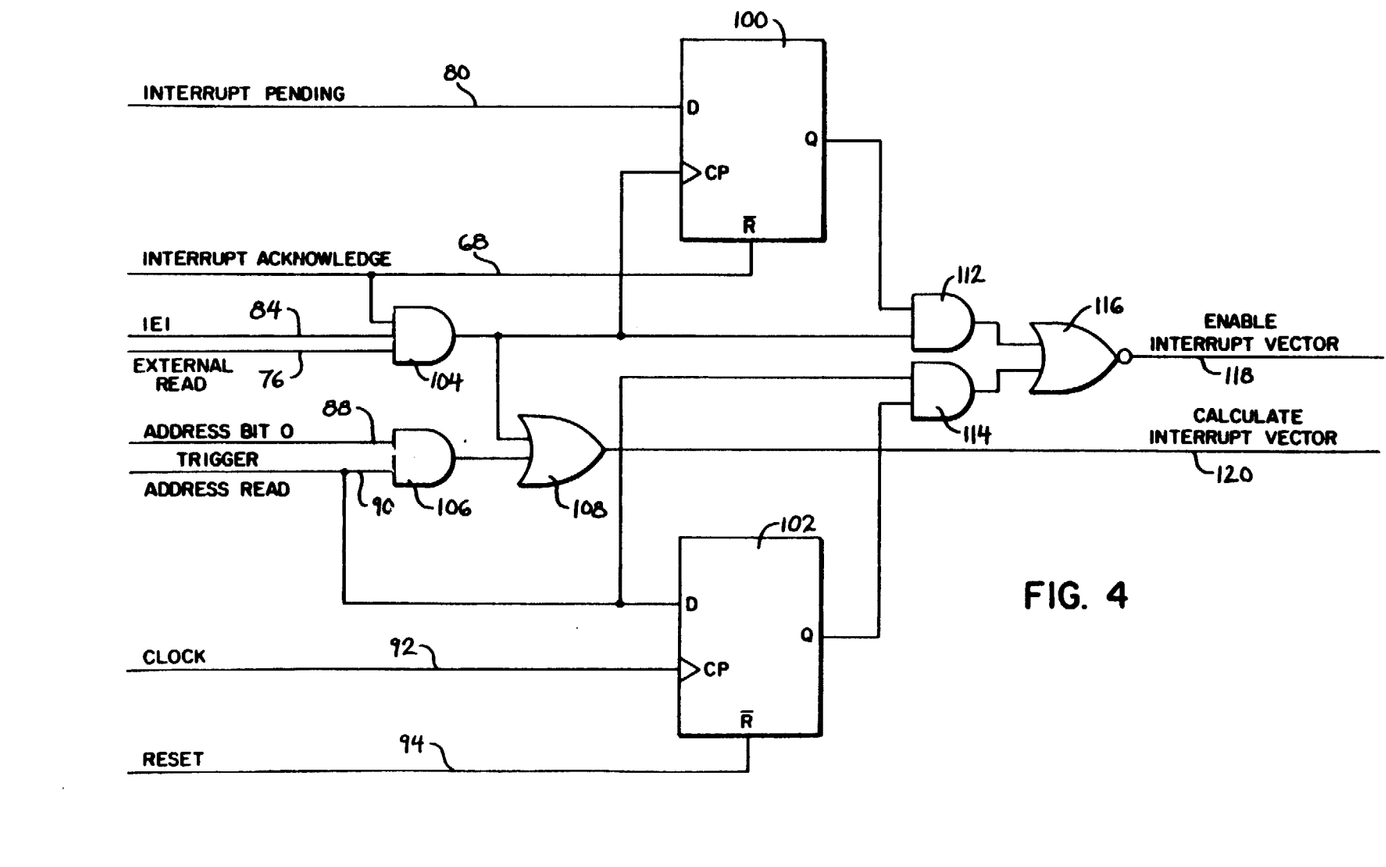
FIG. 4 is a schematic diagram of the interrupt handling circuitry of the node adapter circuit of FIG. 2.

Referring to FIG. 4, the node adapter circuitry for integrating these two types of interrupt responses is shown. In a conventional interrupt, an interrupt pending line 80 goes high indicating that an interrupt has been generated by the node adapter 24. This interrupt pending line connects to the "D" input of a D-type flip-flop 100. Upon the occurrence of an interrupt acknowledgement signal on line 68, an IEI signal on line 84, and an external read signal on line 76, combined by AND gate 104 the interrupt pending signal is latched by flip-flop 100.

The IEI signal 84 is used to permit other interrupting devices to be connected to the external microprocessor 40 without interference. If another such device is processing an interrupt, the IEI signal 84 is pulled low by that device to inhibit the interrupt processing of the node adapter 24. The external read signal 76 is derived from the RAM control signals 56–60 described above and indicates that the RAM 34 is being read by the microprocessor 40.

The output of flip-flop 100 is combined with the output of AND gate 104, by AND gate 112, and connected to one input of NOR gate 116 to produce an enable interrupt vector signal 118 which causes the interrupt vector to be presented to the microprocessor 40 via data lines 64. The output of AND gate 104 is also connected to one input of OR gate 108 to create the calculate interrupt vector signal 120 which causes the calculation of the interrupt vector in response to the type of interrupt required and resets the interrupt pending signal on line 80 and the interrupt signal 66 to microprocessor 40.

In a polling procedure, address bit zero on line 88 and trigger address read on line 90 are combined by AND gate 106. Address bit zero 88 is the least significant bit of the address lines 62 (as shown in FIG. 2). The trigger address read signal 90 is produced by an internal address decoder (not shown) and indicates that the microprocessor 40 has attempted a read of the trigger location, as previously described for the polling response. More specifically, the address decoder detects two consecutive trigger addresses. Either address may be read by the microprocessor 40 depending on the state of address bit zero 88. If address bit zero 88 is high when the trigger address is read, then the output of AND gate 106 is high. This output is connected to the remaining input of OR gate 108 to create the calculate interrupt vector signal 120 which calculates the interrupt vector depending on the type of interrupt required and resets the interrupt pending signal on line 80 and the interrupt signal 66. If address bit zero 88 is low, the calculate interrupt vector signal 120 is not created and the interrupt vector in RAM 34 is not updated.

In either case, when the interrupt address read line 90 goes high, the "D" input of D type flip-flop 102 is pulled high. The next clock signal 92 from the node adapter's internal clock sets the output of this flip-flop 102. The output of flip-flop 102 is combined with the trigger address read signal 90 by AND gate 114 and connected to the remaining input of NOR gage 116 to produce an enable interrupt vector signal 118 which causes the interrupt vector to be presented to the microprocessor 40 via data lines 64 in response to the microprocessor's reading of the trigger address.

Accordingly, in the polling mode of operation, the interrupt vector may be "read" from one of two predetermined trigger addresses. The higher address, indicated by address bit zero being high, outputs the latest interrupt vector on the data lines 64. The lower address, indicated by address bit zero being low, outputs the previous interrupt vector and does not update the addresses in RAM 34. This lower address is useful primarily as a troubleshooting aid. Reading the higher address resets the interrupt line 66 without the use of the interrupt acknowledge line 68 thereby simplifying the interface with the microprocessor 40.

E. Flag Multiplexing

As described above, the serial I/O unit 38 communicates with the controller 32 via an 8-bit data bus 45 and a received data bus 43. The 8-bit data bus 45 may be used to transmit a single word of data from the controller 32 to the serial I/O unit 38 and hence to the remote I/O link 18. Conversely, the received data bus 43 may be used to transmit a single word of data received by the serial I/O unit 38, from the remote I/O link, to the controller 32.

The serial I/O unit 38 periodically also receives other important status information, distinct from the link data, that may be required by the controller 32. For example, in the SDLC serial link protocol, used in the preferred embodiment, an "abort" or "flag" character may be transmitted encoded within the data on the serial link 18. When received by the serial I/O unit 38, these control characters are decoded and status flags within the serial I/O unit 38 are set. This decoding is a low level link protocol and therefore invisible to the controller 32. Nevertheless, the controller 32 may require the information contained in these status flags. For example, the abort flag indicates that the entire frame of data should be disregarded. The controller 32 must have access to the abort status flag so as to prevent aborted data from being transmitted to the external microprocessor 40. The controller 32 also requires access to the "flag" flag which indicates the start and end of a data frame and is used by the controller 32 to determine when to verify error correction codes as well as for other purposes.

One means of communicating the state of the status flags in the serial I/O unit 38 to the controller 32 would be to use the received data bus 43. The approach, however, would require a full data transfer cycle for the status flags after each transfer of link data, effectively halving the speed of the controller received data bus 43.

The approach adopted in the present invention is to transfer the status flags from the serial I/O unit 38 to the controller 32 via the instruction flags associated with the controller's arithmetic/logic unit ("ALU") (not shown) during the execution of the controller's "get received data" ("GRD") instruction that reads data from the serial I/O unit 38. The GRD instruction would not normally modify the ALU's flags hence the flags are free to be used to communicate other information to the controller 32. This use of the ALU flags therefore allows additional bits to be communicated between the serial I/O unit 38 and the controller 36 without use of the received data bus 43.

The controller 32 uses three status flags: "carry", "minus" and "zero". These flags indicate the result of various logical and arithmetic operations performed by the controller's ALU as is well understood in the art. For example, the carry flag is typically set if the result of an arithmetic operation by the ALU is such as to produce an overflow or underflow. Also, the carry flag is typically used to hold the overflow bits that occur during shift left or shift right logical operations.

Figure 5:
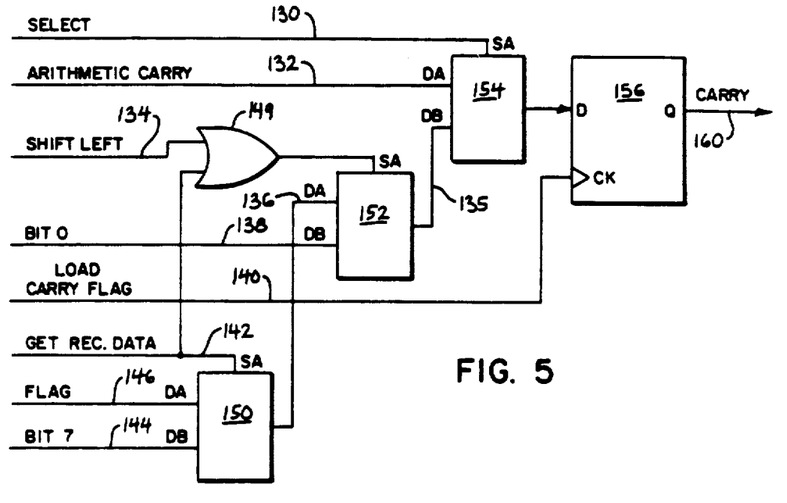
FIG. 5 is a schematic diagram of the flag multiplexer circuitry of the node adapter circuit of FIG. 2.

Referring to FIG. 5, the ALU's carry flag 160 is indicated by the state of the output of D type flip flop 156. An instruction decoder (not shown), as is generally understood in the art, produces a select signal 130 if the instruction presented to the ALU is an arithmetic instruction. The select signal is connected to the select input of a dual input multiplexer 154. If the select signal is active, multiplexer 154 connects the input of flip-flop 156 to the arithmetic carry signal 132 from the ALU. If the instruction to the ALU is not an arithmetic instruction, as indicated by select signal 130, then multiplexer 154 connects the input of flip-flop 156 to the output of multiplexer 152.

The instruction decoder also produces a shift left signal 134 and a GRD (get received data) signal 142 which are combined by OR gate 149 to produce a select signal for multiplexer 152. If there is no shift left 134 or GRD 142 instruction, the input of flip flop 156 is connected to the bit zero line 138 of the ALU's accumulator, via the combined action of multiplexer 154 and 152, to be loaded with the overflow bit resulting from a shift right instruction as is generally appreciated by those skilled in the art.

Alternatively, if there is a shift left or GRD instruction, indicated by lines 134 and 142 respectively, the input of flip-flop 156 is connected to the output of multiplexer 150.

If there is no GRD instruction 142 and hence implicitly only a shift left 134, the input of flip-flop 156 is connected to the bit seven line 144 of the ALU's accumulator, via the combined action of multiplexers 154, 152, and 150 to be loaded with the overflow resulting from a shift left instruction as is generally appreciated by those skilled in the art. Conversely, if there is a GRD instruction 142, hence implicitly no shift left instruction 134, the input of flip-flop 156 is connected to the flag line 146 from the serial I/O unit 38, via the combined action of multiplexers 154, 152, and 150 allowing the status information from the serial I/O unit 38 to be communicated to the controller 32.

In an analogous manner, the ALU's zero flag is used to indicate both zero flags from the ALU's arithmetic and logical operations and the "normal byte" status flag on line 48 (shown in FIG. 2) from the serial I/O unit 38 when the GRD instruction is invoked.

The above description has been that of a preferred embodiment of the present invention. It will occur to those who practice the art that many modifications may be made without departing from the spirit and scope of the invention. In order to apprise the public of the various embodiments that may fall within the scope of the invention, the following claims are made.

I claim:

1. In a node adapter circuit for providing communications between a serial data link and either of one of two classes of microprocessor through a shared random access memory, one class of microprocessor producing a microprocessor strobe signal and a microprocessor read/write signal for accessing the memory and the other class of microprocessor producing a microprocessor read signal and a microprocessor write signal for accessing the memory, the random access memory having a read operation and a write operation as controlled by a memory strobe signal and a memory read/write signal, a read/write interface circuit comprising:

a read line, a write line, and a chip selector line, receiving, at the chip selector line, the microprocessor strobe signal and, at the write line, the microprocessor read/write signal when the read line is grounded, and receiving, at the read line, the microprocessor read signal and, at the write line, the microprocessor write signal when the chip select line is grounded;

a logic means receiving the read line, write line, and chip selector line for producing the memory strobe signal in response to a signal on the chip select line together with a signal on the read line or a signal on the write line; and a connecting path for communicating the signal on the write line directly to the memory as the read/write signal.

* * * * *

UNITED STATES PATENT AND TRADEMARK OFFICE
CERTIFICATE OF CORRECTION

PATENT NO. : 5,155,839

DATED : October 13, 1992

INVENTOR(S) : Weppler

It is certified that error appears in the above-identified patent and that said Letters Patent is hereby corrected as shown below:

On the title page, item [54] and column 1, line 2, "Apparatus Using In" should read --Apparatus Using An--

| | |
|---|---|
| Col. 6, line 4 | "processor interface 40" should be -- processor 40. The controller 36 communicates with the microprocessor --. |
| Col. 6, line 4 | "8-bit data but" should be -- 8-bit data bus --. |
| Col. 6, line 51 | "edge of the input" should be -- edge of the output --. |

Signed and Sealed this

Twelfth Day of October, 1993

Attest:

BRUCE LEHMAN

*Attesting Officer*  *Commissioner of Patents and Trademarks*